United States Patent
Dickerson et al.

(10) Patent No.: US 6,210,721 B1
(45) Date of Patent: Apr. 3, 2001

(54) MICROWAVE POPCORN INCORPORATING COARSE SALT AND METHOD OF PREPARATION

(75) Inventors: Pamela J. Dickerson, Eden Prairie; Brian E. Glass, Maple Grove, both of MN (US)

(73) Assignee: General Mills, Inc., Minneapolis, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/436,823

(22) Filed: Nov. 9, 1999

Related U.S. Application Data

(63) Continuation of application No. 09/039,504, filed on Mar. 16, 1998, now Pat. No. 5,997,916.

(51) Int. Cl.[7] ................................. A23L 1/18; A23B 9/14
(52) U.S. Cl. .......................... 426/74; 426/107; 426/118; 426/121; 426/124; 426/238; 426/309; 426/395; 426/401; 426/413
(58) Field of Search .............................. 426/74, 107, 118, 426/121, 124, 238, 309, 395, 401, 413; 219/727

(56) References Cited

U.S. PATENT DOCUMENTS

| 3,851,574 | 12/1974 | Katz et al. . |
| 4,096,281 | 6/1978 | Young et al. . |

(List continued on next page.)

FOREIGN PATENT DOCUMENTS

WO 95/01105   12/1995   (WO) .

OTHER PUBLICATIONS

Robert S. Igoe, Feb. 1983, *Dictionary of Food Ingredients*, 19.

Primary Examiner—Nina Bhat
(74) Attorney, Agent, or Firm—John A. O'Toole; Douglas J. Taylor; Everett G. Diederiks, Jr.

(57) ABSTRACT

A microwave popcorn article comprising any conventional microwave popcorn bag, and a food charge disposed therein including kernel popcorn, fat, salt and sufficient amounts of a calcium ingredient to provide a total calcium content of about 360 to 3600 mg per 100 grams of unpopped popcorn is provided. The salt ingredient includes at least a portion in coarse form having a particle size larger than 250 microns. Methods of preparing such microwave popcorn articles are disclosed wherein some of the salt and/or calcium ingredient is added to the fat, while the balance of the salt is added in particulate form in a separate step after the fat and kernel popcorn have been added to the bag.

11 Claims, 2 Drawing Sheets

U.S. PATENT DOCUMENTS

| | | |
|---|---|---|
| 4,450,180 | 5/1984 | Watkins . |
| 4,548,826 | 10/1985 | Watkins . |
| 4,604,854 | 8/1986 | Andreas . |
| 4,806,371 | 2/1989 | Mendenhall . |
| 4,844,921 | 7/1989 | Bakal et al. . |
| 4,904,487 | 2/1990 | LaBaw et al. . |
| 4,904,488 | 2/1990 | LaBaw et al. . |
| 4,906,490 | 3/1990 | Bakal et al. . |
| 4,960,606 | 10/1990 | Crosby . |
| 5,075,119 | 12/1991 | Mendenhall . |
| 5,190,777 | 3/1993 | Anderson et al. . |
| 5,268,186 | 12/1993 | Moskowitz . |
| 5,443,858 | 8/1995 | Jensen et al. . |
| 5,463,845 | 11/1995 | Gwiazdon et al. . |
| 5,514,407 | 5/1996 | Perlman et al. . |
| 5,514,854 | 5/1996 | Atsaves . |
| 5,624,703 | 4/1997 | Perlman et al. . |
| 5,688,543 | 11/1997 | Freeport et al. . |
| 5,690,979 | 11/1997 | Bourns et al. . |
| 5,695,806 | 12/1997 | Bateman . |
| 5,747,080 | 5/1998 | Lemke et al. . |
| 5,750,166 | 5/1998 | Schellhaass . |
| 5,753,287 | 5/1998 | Chedid et al. . |
| 5,897,894 * | 4/1999 | Glass ............................ 426/89 |
| 5,919,505 * | 7/1999 | Monsalve et al. ............. 426/107 |
| 5,997,916 * | 12/1999 | Dickerson et al. ............. 426/74 |

* cited by examiner

MICROWAVE POPCORN INCORPORATING COARSE SALT AND METHOD OF PREPARATION

CROSS REFERENCE

The present application is a continuation of U.S. application Ser. No. 09/039,504 filed Mar. 16, 1998 now U.S. Pat. No. 5,997,916.

FIELD OF THE INVENTION

The present invention relates to packaged food products. More particularly, the present invention relates to microwave popcorn product articles characterized by calcium fortification and to methods for filling such articles.

BACKGROUND

Popcorn is a highly popular snack food item. In the past, the at-home preparation of popcorn by the consumer involved adding kernel popcorn plus a cooking oil to a covered pot and heating until the, popcorn kernels popped to make popcorn. As used herein, "kernel popcorn" refers to unpopped popcorn. The noun "popcorn" or synonymously "popped popcorn" refers herein to popped kernel popcorn. The adjective "popcorn" can refer to either. Once prepared, common, relatively coarse, table salt is a frequently added flavoring or condiment. The resultant salted popped popcorn is a familiar snack food.

More recently, microwave popcorn products have become extremely popular. At present, in the U.S., over 70 different brands of microwave popcorn products are available. In general, the more popular microwave popcorn products comprise an expandable paper bag containing a charge of kernel popcorn, fat and salt. The microwave popcorn article is adapted to be heated in a microwave oven for three to five minutes to produce the popped popcorn. More recently, improved microwave popcorn articles have been fabricated employing a metallized susceptor which facilitates the heating of the kernel popcorn-fat charge and which, in turn, leads desirably to increases in popcorn volume and decreases in unpopped kernels. Microwave popcorn articles of this type are described in detail in, for example, U.S. Pat. No. 4,450,180 (issued May 22, 1984 to J. D. Watkins and incorporated herein by reference).

Microwave popcorn articles, of course, comprise a microwave popping bag and a charge of kernel popcorn, fat, and, usually, salt. Certain early patents taught the addition of kernel popcorn, fat and salt in the form of a prefabricated toroid or doughnut shaped piece. The piece was fabricated by mixing the kernel popcorn, salt and melted fat to form a blend and the blend was allowed to cool and harden into the toroid shape desired. These circular pieces were then dropped into the desired chamber of the popcorn bag prior to final sealing. (See for example U.S. Pat. No. 4,450,180, issued May 22, 1984).

Contemporary methods of filling microwave popcorn bags, however, employ a different filling process and technique. (See, for example, U.S. Pat. No. 4,604,854 entitled "Machine For Forming, Filling and Sealing Bags," issued Aug. 12, 1986 to D. W. Andreas). The microwave bags having an unsealed open end are advanced to a first kernel popcorn filling station. While being maintained in an open position, the kernel popcorn is charged to the desired channel. Thereafter, the bags are advanced to a second filling station at which the fat/salt slurry is added to the bag. Typically, the slurry is added in the form of a vertically dispensed pencil jet (i.e., a confined stream) of the slurry. Single station filling methods are also known that involve applying the fat/salt slurry as a spray onto the kernel popcorn as the kernel popcorn falls into the bag. (See, for example WO 95/01105 entitled "Reduced Fat Microwave Popcorn and Method of Preparation" published Jan. 12, 1995, or, equivalently, U.S. Pat. No. 5,690,979 issued Nov. 25, 1997) which is incorporate herein by reference. Such single station filling techniques are especially useful for the preparation of low fat microwave popcorn products.

The bags now containing both kernel popcorn and slurry are then advanced to a sealing station where the bags are provided with a top seal to complete the closure of the bag. The sealed popcorn bags are advanced to subsequent finish packaging operations which complete the folding of the bags, providing the bags with an overwrap, and inserting appropriate numbers of the bags into cartons, etc.

Thus, while microwave popcorn products are popular, it would be desirable if such microwave popcorn products were fortified with supplemental calcium to provide a significantly nutritionally enhanced product. By significantly nutritionally enhanced is meant a product having at least 10% of the current recommended daily intake ("RDI") or at least 360 mg of calcium (including both the native and supplemental contributions) per 100 grams of unpopped microwave popcorn.

One conceivable approach is to merely add the calcium along with the salt to the slurry to facilitate calcium fortification of the food charge. However, a first problem can reside in the slurry viscosity. The slurry viscosity rises rapidly as more particulates are added. If an additional particulate is desired to be added to the slurry such as for flavor or mineral fortification, then addition of requisite amounts of salt to the slurry results in a slurry having a paste consistency and a viscosity too high to pump. This is especially true in the more concentrated slurry typically used for ultra low fat popcorn—usually about 94% fat free.

A second problem is plugging of the orifice of the pencil jet nozzle used to charge the slurry to the bag that can occur when the slurry viscosity is too high. While plugging is a problem when salt alone is added to the slurry, such plugging problems are compounded when the slurry contains supplemental particulates such as a calcium mineral.

Still another problem with adding is that the calcium ingredient is to ensure that the calcium ingredient is both visually and organoleptically indiscernible.

In view of the prior art and the problems described above, there is a continuing need for new and useful microwave popcorn products that provide enhanced nutrition and particularly enhanced calcium levels. Accordingly, it is an object of the present invention to provide microwave popcorn products having improved mineral nutrient properties.

In particular, it is an object of the present invention to provide methods for preparing calcium fortified microwave popcorn products.

In view of these processing difficulties, a further important object of the present invention is to provide for commercially practical methods for preparing calcium fortified microwave popcorn products.

Still another object of the present invention is to provide methods for prepared calcium fortified microwave popcorn products wherein the calcium is supplied by insoluble calcium salts such as calcium carbonates.

Still another object of the present invention is to provide calcium fortified microwave popcorn having desirable levels of salt.

It has been surprisingly discovered that the above objectives can be realized and superior microwave popcorn products provided by formulating food charge compositions disposed with microwave popcorn bags, popcorn fat, salt and a calcium ingredient of particular particle size.

It has been surprisingly discovered that the above objectives can be realized and that microwave popcorn articles can be provided that exhibit novel consumer appeal. In the preferred embodiment, the present invention resides in part in the separate, sequential filling of kernel popcorn, fat and at least a portion of the salt and/or calcium ingredient in particulate form at their individual respective filling stations. By applying the kernel popcorn/fat/salt separately in the particular sequence in combination with selecting salt and the calcium ingredient each of a particular particle size range, improved calcium enriched microwave popcorn articles are achieved.

SUMMARY OF THE INVENTION

Figure 1:
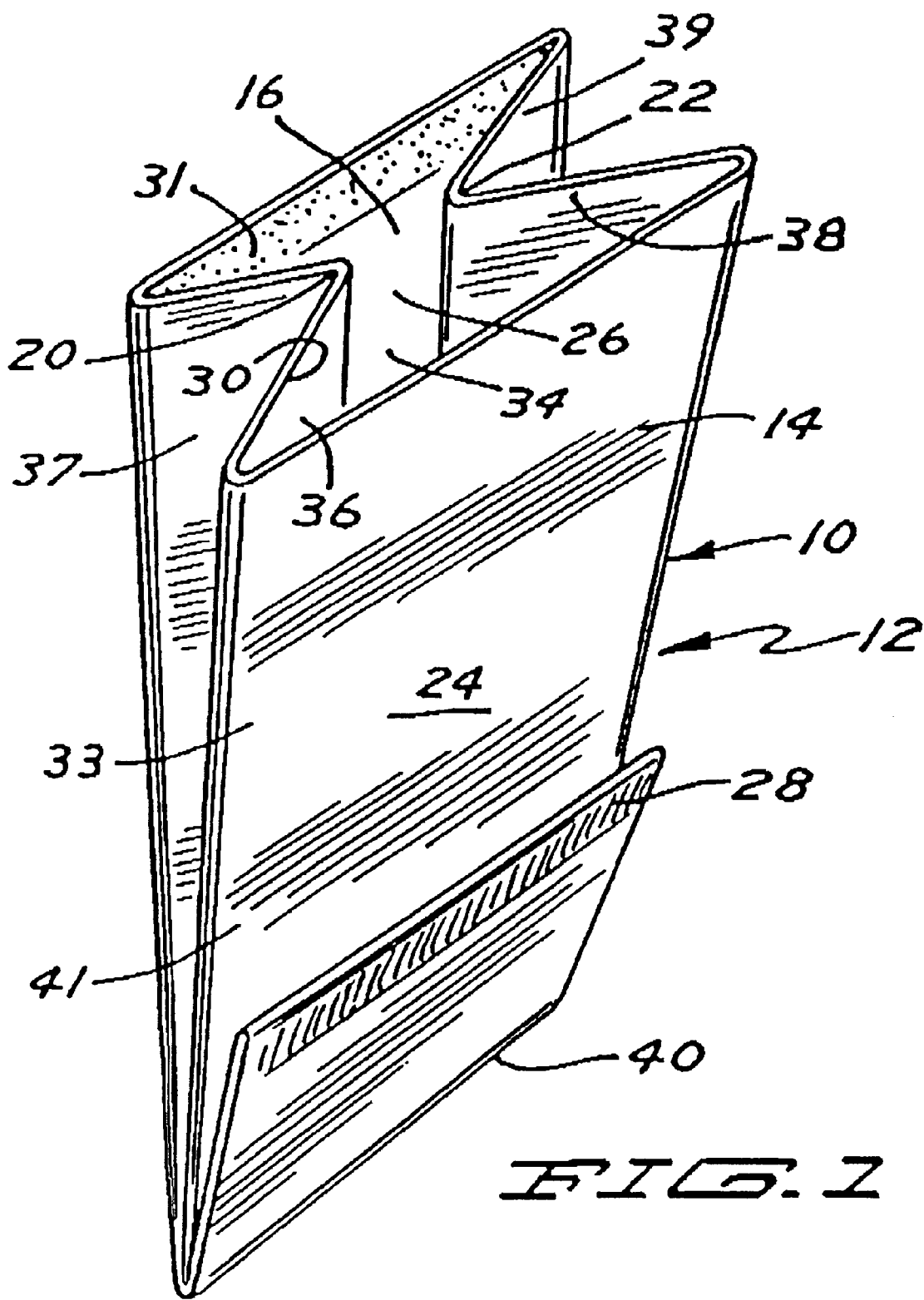
FIG. 1 is a perspective view of an unsealed, folded microwave popcorn bag.

In its article aspect, the present invention relates to improved microwave popcorn articles. The present microwave popcorn articles essentially comprise a microwave popcorn bag and a novel calcium enriched food charge dispersed therein. The calcium enriched food charge essentially comprises kernel popcorn and optionally further comprises fat and/or salt. The kernel popcorn component essentially comprises about 60 to 97% of the charge. The charge further essentially includes sufficient amounts of a calcium source ingredient to provide a total calcium content of 360 to 3600 mg per 100 grams of unpopped popcorn. The total calcium content includes both the native level supplied by the popcorn (and other ingredients) as well as the supplemental added calcium.

The food charge can include about 2 to 40% of the fat component and about 1 to 4% salt. The calcium mineral is essentially characterized by a particle size wherein at least 50% of the calcium component has a particle size of about 1 to 20 $\mu$m.

In its method aspect, the present invention resides in methods for filling a microwave popcorn bag with popcorn kernels coated with a fat and salt. The salt can be either ultra fine (mean particle size of about 20 $\mu$m) or coarse salt (mean particle size of about 400 $\mu$m).

The present methods of calcium fortified microwave popcorn article preparation comprise the steps of:

A. providing a microwave popcorn bag having a sealed bottom end, an open sealable top end defining an upper orifice and a transversely extending seal area in an open configuration and in a vertically aligned orientation;

B. filling the bag through the upper orifice defined by the open top end with a quantity of popcorn kernels and the fat slurry;

C. filling the bag through the upper orifice defined by the open top end with a quantity of a calcium ingredient wherein at least 50% of the calcium ingredient is in the form of a flour particulate having an average particle size of less than 25 microns to provide a total calcium content of about 360 to 3600 mg per 100 grams of unpopped popcorn to provide a calcium fortified food charge; and D. sealing the open top end of the popcorn bag after the bag has been filled with the quantity of popcorn kernels, the fat slurry, and the quantity of calcium ingredient to provide a calcium fortified microwave popcorn article.

DETAILED DESCRIPTION OF THE INVENTION

The present invention relates to improved microwave popcorn articles fortified with calcium and to their methods of preparation. The present microwave popcorn articles essentially comprise a microwave popcorn bag and a food charge disposed within the bag, said food charge comprising a quantity of 1) kernel popcorn, 2) fat, 3) salt, and 4) a calcium ingredient. Each of these article components as well as methods of filling, product use and attributes are described in detail below.

Throughout the specification and claims, percentages are by weight and temperatures in degrees Fahrenheit unless otherwise indicated.

Microwave Bag

The present microwave popcorn articles essentially comprise a conventional microwave popcorn popping bag. Useful herein for the microwave popping bag are a wide variety of microwave bags available commercially or known in the art. Useful microwave bags herein can include any conventionally useful bag for microwave popcorn products.

For example, a suitable bag widely used commercially and preferred for use herein is described in U.S. Pat. No. 4,450,180 patent which is incorporated herein by reference. A generally similar bag is described in U.S. Pat. No. 4,548,826. Generally, the bag therein described comprises and is fabricated from a flexible sheet material having two collateral tubular sections. The sections are parallel longitudinally extending that communicate with each other at the center of the package.

Referring now briefly initially to FIG. 1, there is shown an embodiment of a microwave popcorn article 10 composed of a microwave bag 12 formed from flexible sheet material such as paper and being of collateral tubular configuration, that is to say, being composed of a pair of parallel longitudinally extending tubes 14 and 16 which communicate with one another along a central longitudinal opening. The two parallel tubes 14 and 16 are separated by longitudinally extending side indentations 20 and 22. When the package comprises a paper bag, the bag can be composed of first and second face panels 24 and 26 respectively and the indentations 20 and 22 comprises gussets. When in a vertically aligned orientation, the bag has a bottom seal 28 and initially an open top or orifice 30 but a sealable seal area 31 that transversely extends the open sealable top. The sealable area can include a heat activated adhesive or a "cold seal" adhesive, as is convenient. After being filled, the top 30 is also sealed conventionally by means of heat or other suitable adhesive to provide a top seal in the top seal area 31.

The bag material is generally fabricated with multiple plies including an outer ply 33 which is generally paper, a grease-proof or resistant inner ply 34 and microwave susceptor film member or ply intermediate these inner and outer paper layers. However, in preferred embodiments the microwave susceptor is present only on one major face panel.

While tubes (or chambers, or channels) 14 and 16 can be of equal size, conventionally the susceptor channel 16 is generally slightly smaller. In such a configuration, the gussets include major left gusset face 36, minor left gusset face 37, major right gusset face 38 and minor right gusset face 39. The bag 12 can be provided with a lower transverse fold 40 to define an intermediate portion or pocket 41.

Although in the present description, a particular description is given to this preferred microwave bag, the present invention is also useful in connection with, for example, flat bottomed bags, bags with or without a bottom fold, with a straight bottom seal or other more complex bottom seal designs. Also, the present methods can be employed using new and improved microwave popcorn bag designs.

Popcorn

The present article 10 further essentially includes a food charge disposed within the bag. The food charge essentially includes a quantity of kernel popcorn. Conventionally, microwave popcorn formulations are now expressed based upon the weight of the entire kernel popcorn and fat food charge. This convention is followed in the present description of the invention. Broadly, the popcorn can range from about 60 to 97% of the popcorn charge. Typically, about 15 to 100 g of kernel popcorn is added to the bag, preferably about 70 to 85 g/bag for regular sized products and about 30 to 50 g/bag for "single portion" sized products. In general practice, the amount of kernel popcorn is set and the other ingredients are varied to provide full fat, reduced or low fat, and/or salted or low salt embodiments.

Conventional kernel popcorn varieties can be used herein. Highly preferred for use herein are relatively larger kernel popcorn varieties. Preferred for use herein are those larger varieties having a kernel count of about 40 to 80 kernels per log, preferably 50 to 65, which are commercially available.

Fat

The food charge of the present articles additionally essentially comprise a quantity of an edible fat. Generally, the present methods are useful in connection with full fat, reduced-fat and with low-fat embodiments. The present invention finds particular suitability for use in connection with snack products that are perceived as being more healthy, such as low fat microwave products. Less preferred but nonetheless useful herein are reduced fat or full fat products. Low fat products have an even lower fat content than reduced fat embodiments. Reduced fat products have a fat content of about 8 to 15% fat. All fat percentages are descriptive of added fat and are not meant to include fat which may be included in the finished product from other ingredients, e.g., the fat from the kernel popcorn. Thus, broadly, the fat can range from about 2 to 40% and about 8 to 15%, (most preferably 10 to 14%) for reduced fat embodiments. Preferred full.fat products can comprise about 20 to 35% fat. In the low fat embodiments the charge essentially comprises about 2 to 8% fat, preferably 3 to 4% fat and for best results about 3.5%.

The fat, preferably semi-solid or solid fat, can be from any conventional, suitable fat(s) or oil(s) or mixtures thereof from vegetable or animal sources including from soybean, cottonseed, safflower, corn, peanut oil(s), butter oil and mixtures thereof. Liquid oils (medium chain trigycerides or interesterified oils) can be used in full or in part as a possible variation to reduced trans fatty acid oils. Liquid oils can be thickened to increase their viscosity (e.g., with silicon dioxide or by being fortified with small amounts of fat hardstock). In other variations, the oils can be partially hydrogenated. Preferred for use herein are fats which are partially hydrogenated soybean and/or corn oil. Also useful herein are tropical oils such as coconut oil and palm kernel oil, although present consumer health trends disfavor utilization of such oils. Also useful herein are non-absorbable fat mimics such as polyglycerol esters.

In a preferred variation, at least a portion of the fat is supplied by a low moisture butter ingredient. Suitable low moisture butter ingredients and methods of preparing microwave popcorn products therewith are described in co-pending commonly assigned U.S. Ser. No. 08/784,850 (filed Jan. 1, 1997) entitled "Shelf-Stable Butter Containing Microwave Popcorn" which is incorporated herein by reference. In general, however, the butter ingredients therein described are low moisture (i.e., less than 3%) butters that are commercially available. The fat/butter blends comprise about 200 ppm antioxidants. To assure shelf stability, the butter content is preferably limited to 10% of the added fat.

Salt The present microwave popcorn articles additionally essentially include a salt component. Of course, microwave popcorn articles conventionally comprise a salt component. Typically, the salt component is a microsized salt, also known as ultrafine salt or pulverized salt or "flour" salt, typically having a mean particle size of about 22 microns. This flour salt is simply physically admixed in with the fat component to form a fat and salt slurry.

In the preferred embodiments, at least a portion of the total salt can be added in the form of a flour sized particulate to the fat slurry. In those embodiments, it is more preferred that the portion of the total salt added as a salt flour to the slurry be at least 60% of the total salt, even preferably more than 75% of the total salt.

In less preferred variations, a coarse salt ingredient can be employed such as described in co-pending commonly assigned U.S. Ser. No. 08/998,751, filed Dec. 29, 1997 entitled "Microwave Popcorn With Coarse Salt Crystals and Method of Preparation" (attorney docket 5108) which is incorporated herein by reference. Generally, the coarse salt therein described has a larger particle size of about 250 to 600 μm. Such coarse salt is added to impart an organoleptic attribute in the finished product microwave popcorn to be more reminiscent of the stove-top at-home popped and seasoned popcorn. While in the preferred embodiments herein the salt is in flour form, in other embodiments all or a part of the salt can be in the form of coarse salt added in the third station or in the separate particulates addition step herein.

Calcium Salt

The present microwave popcorn products essentially further comprise a calcium ingredient of defined particle size in an amount effective to provide the desired calcium enrichment. Good results are obtained when the present microwave popcorn products contain about 360 to 3600 mg per 100 grams of the food charge. Better results are obtained when the calcium is present at levels of about 360 to 1800 mg per 100 grams. For best results, the total calcium present ranges from about 930 to 1400 mg per 100 grams of the food charge. Excessive calcium fortification is to be avoided in part because the finished product can undesirably exhibit a dry texture, gritty mouth feel, and lower taste perception of flavor and salt.

At a calcium concentration of 360 to 930 mg per 100 grams of the food charge, the finished popped product provides about 10% of the currently recommended daily intake for calcium and thus can be described as "a good source of calcium." The levels in the microwave article suitable for microwave popping account for an estimated 40% loss factor for calcium as the popcorn goes from its unpopped state to the popped state. In addition, these levels also reflect the amount consumed based on the current serving size of 30 grams for popped product as defined by the Food and Drug Administration (FDA).

Useful herein are calcium ingredients that supply at least 20% calcium. For example, a good calcium ingredient herein is calcium carbonate in that calcium carbonate comprises about 40% calcium. While expensive, food grade calcium carbonate obtained by chemical reaction processes is desirable due to low levels of impurities. A good, inexpensive source of calcium carbonate from natural sources is ground limestone. Care should be exercised in selecting sources of ground limestone that are low in trace metals, especially such heavy metals such as lead. In particular, it is desirable that the ground limestone have trace metal concentrations of less than 10 ppm.

Soluble calcium salts typically are expensive and contain low weight percentages of calcium. While calcium chloride is an exception to this generalization, addition of significant calcium levels supplied by calcium chloride impart an unacceptable bitter flavor to microwave popcorn products. In addition, by adding sufficient amounts of many of these calcium salts to achieve the desired fortification level, the finished product may exhibit an undesirably dry texture and gritty mouth feel.

Also useful herein are insoluble mineral calcium salts, particularly calcium phosphate salts provide high levels of calcium and are relatively inexpensive. Moreover, such calcium phosphate salts can be used to provide calcium at high fortification levels with an acceptable taste. Calcium phosphate is generally available as a monobasic (CaH4 (PO4)2.H2O), dibasic (CaHPO4.2H2O) or tribasic (Ca3 (PO4)2) salts. Preferred for use herein is tricalcium phosphate, Ca3(PO4)2, ("TCP") because of its high weight percentage of calcium (about 38%). Moreover, TCP is slightly more soluble than other calcium phosphate salts.

A useful tricalcium phosphate starting material is also known as tribasic calcium phosphate or tricalcium orthophosphate and is available in food chemicals codex grade from Monsanto or Rhone Poulenc, having the general formula $3Ca_3(PO_4)2.Ca(OH)2$. This product provides an assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also available from Stauffer in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

Phosphate salts are a preferred source of calcium, not only because of their acid solubility and weight ratios, but also because they are available commercially as a precipitate from whey, a natural dairy product.

The skilled artisan will appreciate that while these calcium phosphate salts are characterized herein as insoluble, of course, some small percentage will dissolve in water depending in part upon the temperature and pH.

Less preferred for use herein but nonetheless useful are other organic calcium salts including calcium ascorbate, calcium citrate, calcium gluconate, calcium lactate, and calcium sulfate. Also useful herein are the calcium citrate malate complexes described in U.S. Pat. No. 5,186,965 entitled "Calcium Citrate Malate Compositions" (Feb. 16, 1993) which is incorporated herein by reference. Such organic calcium salts are less preferred primarily based upon cost considerations.

Preferred for use herein are calcium ingredients selected from the group consisting of food grade calcium carbonate, ground limestone, calcium phosphate salts and mixtures thereof.

The calcium ingredient regardless of source or type is further essentially characterized by a particularly fine particle size. Such a fine or flour form of the calcium ingredient provides a particle size such that the average particle size is less than 25 μm.

Even more preferred for use herein are calcium ingredients having a mean particle of less than 15 μm and for best results less than 10 μm. A good material, for example, is a ground limestone of high purity having an average particle size of 3.8 μm available from Pluess-Stauffer (California), Inc. (Lucerne Valley, Calif.).

Optional Ingredients

While in the preferred embodiment the particulate addition in the third or separate particulate addition step after the slurry has been added is a calcium ingredient, the skilled artisan will appreciate that other particulates can be conveniently added in the third filling station or in this step. Such additional particulates can include a wide variety of materials intended to provide various flavor or nutritional advantages. Such materials include sugars, dried dairy ingredients such as dried cheese solids, other minerals, magnesium oxide and mixtures thereof.

However, in more preferred embodiments, the present microwave products are additionally characterized as being sugar free (i.e., by total mono- or disaccharide content of less than 0.5%). Such products exhibit greater shelf stability as well as minimization of sugar related scorching and burning.

In other more preferred embodiments, the present microwave products are additionally characterized as being free of a cheese constituent (i.e., having a cheese ingredient content of less than 0.5%, dry weight basis). Cheese ingredients can also undesirably contribute to scorching and burning problems in microwave popcorn products. It is believed that these problems are due to the protein and sugar (e.g., lactose) constituents thereof. Thus, dried cheeses being generally low in fat and thus high in other constituents are particularly undesirable.

In highly preferred embodiments, the present articles are both sugar(s) free and cheese ingredient free.

Method of Preparation

Figure 2:
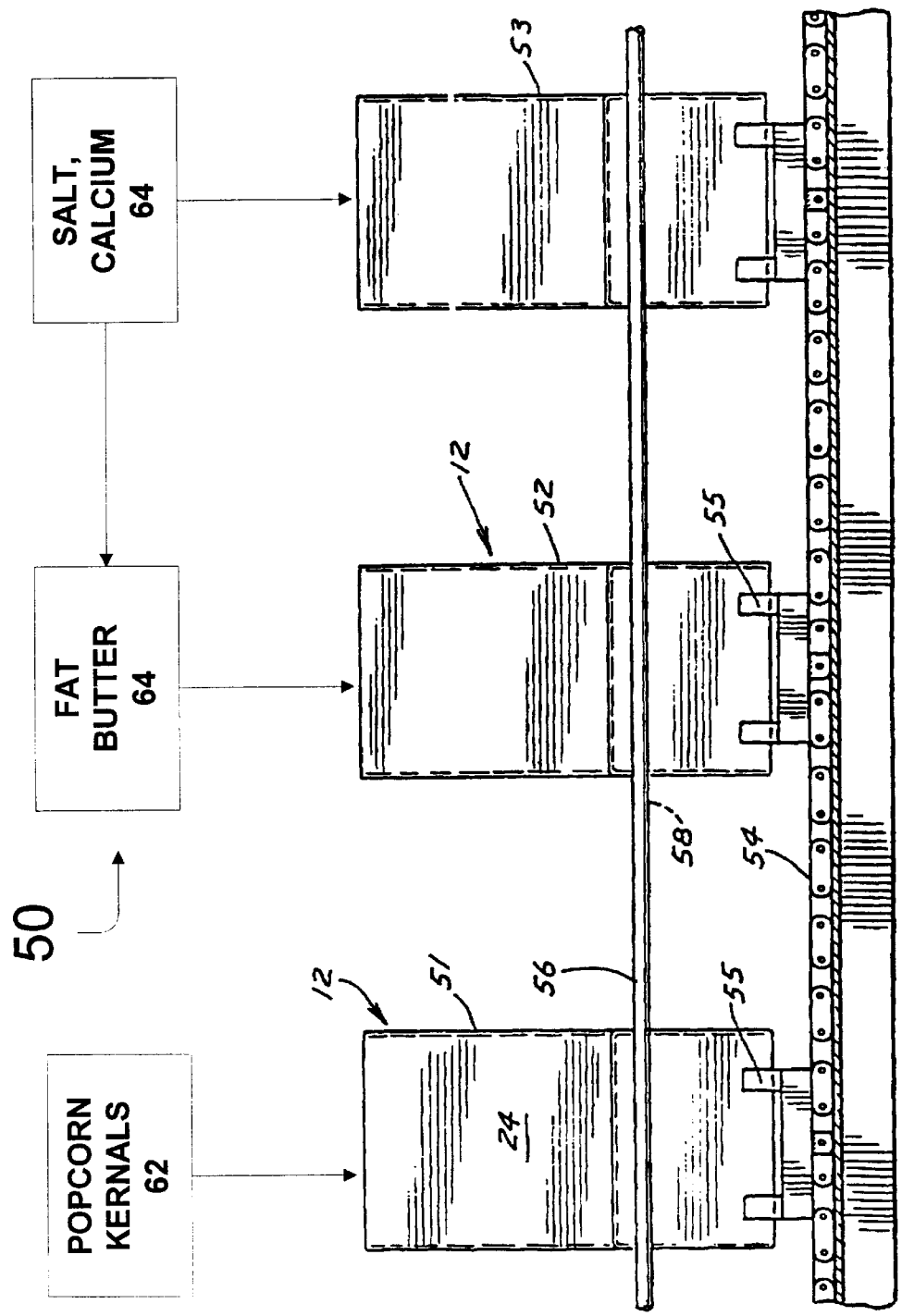
FIG. 2 is a diagramatic view of one method of filling a microwave popcorn bag in accordance with the invention.

Now referring to FIG. 2, there is seen a schematic of the method of preparation preferred for use herein generally designated by reference numeral 50. The drawing shows a conventional microwave packaging line and depicts three stations thereof designated generally by reference numbers 51, 52 and 53. In upstream stations, (not shown) the tubular bag material is cut into desired lengths, and is provided with the bottom seal 28. Additionally, in upstream stations (not depicted), the bags 12 are folded to have their bottom third folded up as depicted in first station 51 of FIG. 2 to provide the first lower transverse fold 40 to provide a sealed portion so that the kernel popcorn, fat charge, and coarse particulate salt can be positioned within the bag in the desired middle portion 41 thereof. The bags 12 are advanced from station to station (left to right) by suitable drive means such as the endless drive chain 54 depicted having bag engagement clips 55. Packaging line speeds range from about 50 to 100 bags per minute. Also, the bottom third of the bags are maintained in the closed position by appropriately spaced parallel guide bars 56 and 58. As can be seen, the bag has an open sealable top portion defining an orifice and has a seal area extending across the orifice. The bag at station 51 is provided in an open configuration and in a vertically aligned orientation.

In the present preferred method of filling microwave popcorn bags, the first station-51 is a popcorn filling station. The fat addition is charged to the bag at a second separate station 52.

Thereafter, the bags being maintained in the upright, folded orientation depicted in FIG. 2 are advanced to the third particulate filling station 53. At the particulate filling station, a quantity of a particulate is then charged to the bag 12 in a separate step.

Once filled with the popcorn, fat slurry and particulate, the bags are then advanced to the sealing station (not shown) wherein the open top end is sealed such as by retractable heat or pressure sealing jaws which impart a seal in the seal area.

The filled and sealed microwave popcorn bags are then advanced to subsequent downstream packaging operations (not shown). Such subsequent downstream packaging operations include folding the bags again to provide a three-folded bag, i.e., to provide a second upper transverse fold; overwrapping the folded bags with an overwrap or moisture barrier layer; and inserting desired numbers of the packaged article into cartons.

Now that the present methods have been described in general terms, in particular, at the filling station 51 the process involves the step 62 of filling the bag through the upper orifice with a quantity of popcorn kernels. Generally, however, the process step can conveniently be practiced at filling station 51 by employing a means for dispensing a measured quantity of kernel popcorn such as a dispensing wheel. The dispensing wheel discharges at timed intervals a measured quantity (e.g., 80 to 90 g) of the kernel popcorn into a vertically oriented filling horn or funnel. The funnel causes the kernel popcorn to fall by gravity into the bag 12.

At the second or fat slurry filling station 52, the present methods additionally include the step 64 of filling the bag 12 through the upper orifice with a quantity of fat (with or without butter).

The term slurry is used herein as is common in the microwave popcorn art to refer to any coating applied to the kernel popcorn. The term "slurry" as used generally herein thus includes fat alone; fat and a lesser portion of salt in flour form; fat, flour salt, flavors and/or color or sweetener(s); fat, a portion of the flour salt and a portion of the calcium ingredient; and fat and substantially all of the calcium ingredient as well as any other variation or combination of ingredients used as an addition to the kernel popcorn herein.

The slurry can additionally optionally comprise minor amounts of other materials employed to make the microwave popcorn more aesthetically or nutritionally or organoleptically appealing. Such adjuvant ingredients can include, for example, sugar(s), minerals, vitamins, colorants, preservatives and flavors. If present, each of these constituents can comprise from about 0.01 to about 2% (or more for sugar, cheese solids) by weight of the fat slurry.

Especially popular for use herein is a butter flavor. The flavors can be either in liquid, fat soluble forms and/or in dry powder forms such as a liquid oil absorbed onto a particulate carrier, e.g., gum arabic, starch, silicon dioxide, or dehydrated cheese solids.

The fat slurry is prepared simply by admixing the fat (in a fluid or melted state) together with any optional ingredients with salt and blending the mixture to form a stable dispersion or slurry. The fat or slurry, while still fluid (700 to 130° F.; 210 to 55° C.), is then sprayed into the microwave popcorn bag as described in detail below.

The slurry application step can be practiced by employing an applicator for spraying the fat slurry (e.g., commercially available from Hibar Systems Limited, Ontario, Canada) that is supplied by a slurry supply means (not shown). The slurry supply means can conveniently include a conventional positive displacement reciprocating metering pump having a piston and a pressurized slurry inlet. The pump precisely pumps metered amounts of the fat slurry to the applicator at closely controllable time intervals.

If the slurry viscosity is too high, then the slurry becomes unpumpable. The concentrations of salt and calcium ingredients are selected such that the slurry has a viscosity of less than 10,000 cps, preferably less than about 4,000 cps, and, for best results, less than 1,000 cps.

The slurry can be added at temperatures ranging from about 15.5 to 65.5° C. (60 to 150° F.), preferably about 21.1 to 54.4° C. (70 to 130° F.). While a pencil jet spray is preferred for use herein, equivalents thereof in terms of dispensing the slurry can also be used. For example, a multiplicity of very fine jet streams, (e.g., 3–12), or a sparge can be used to achieve the desired dispersion hereunder. Also, other spray types, (e.g., a cone spray, a mist spray, or a fan spray) are useful herein. However, great care must be taken in selecting such useful alternatives so as to avoid getting slurry in the bag seal area. In other embodiments, the spray can be gas assisted, e.g., air, steam, or inert gas.

In preferred embodiments, the bag 12 has a microwave chamber (i.e., wherein one major face panel has an intermediate microwave susceptor layer between the inner and outer bag layers) and, for cost considerations, a microwave susceptor-free chamber. In the preferred practice, the kernel popcorn, fat slurry and particulate(s) are charged to the microwave channel. Conventionally, the microwave channel is the lesser channel (i.e., being formed by the smaller major face 24) and the greater channel is the microwave free channel. Such a configuration minimizes the amount of relatively expensive microwave susceptor material required while nonetheless providing the needed expansion volume upon microwave popping.

In the preferred form, the popcorn charging and slurry addition are practiced at separate stations and as separate steps. However, in other embodiments, the kernel popcorn and slurry addition can be practiced in a single station concurrently. Apparatus and techniques for such concurrent filling of the popcorn and slurry are described in commonly assigned U.S. Pat. No. 5,690,979 (issued Nov. 25, 1997) entitled "Method Of Preparing Reduced Fat Microwave Popcorn."

At station 53, it can be seen that the present methods additionally comprise the step 66 of filling the bag with a quantity of a particulate after the bag is filled with popcorn and fat.

Generally, however, the particulate filling station 53 includes a means for dispensing a measured quantity of salt, calcium ingredient(s), other particulates and mixtures thereof.

If high levels of salt and calcium ingredients are desired in the finished products, addition of the total quantity of each of these materials to the slurry will cause the slurry viscosity to be excessively high. That is, while the slurry may be able to carry all of the salt or all of the calcium ingredient, or half of each, the slurry cannot carry all of both. Thus, either all of the salt or all of the calcium ingredient or a portion of each (e.g., 50:50 or 70:30) must be added as dry particulates in the third filling station or in the present essential particulates addition step. Useful herein for practicing this step are particulate metered feeding equipment that are commercially available such as are used for filling salt or sugar packets.

The present methods further essentially include a conventional finish step (not shown in FIG. 2) of sealing the open end of the microwave popcorn bag after the bag has been filled with the quantity of popcorn kernels, the fat slurry and the quantity of particulates.

Product Use

The microwave popcorn products prepared as described can be used in a conventional manner for the at-home preparation of popcorn by microwave heating. Upon microwave heating of the sealed microwave popcorn article in a conventional home microwave oven, the resultant popped popcorn in the form of free flowing of individual substantially unagglomerated popped popcorn kernels exhibits excellent organoleptic attributes notwithstanding the calcium fortification. Regrettably, up to about 40% of the added calcium is lost within the microwave popcorn bag and does not adhere to the popped popcorn.

INDUSTRIAL APPLICABILITY

The present invention finds suitability for use in the provision of a mass market, shelf stable consumer food item adapted to prepare oiled, flavored popcorn upon microwave heating that is calcium fortified to at least 0.03% calcium.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the microwave popcorn art, can be undertaken without departing from the spirit and scope of the invention.

EXAMPLE 1

An improved microwave popcorn article of the present invention comprising a microwave popcorn bag is prepared having the popcorn/fat charge of the composition indicated below. The microwave popcorn bag is fabricated substantially in accordance with the teachings of U.S Pat. No. 4,450,180. Microwave popcorn articles comprising microwave popcorn bags of this type are available under the brand name Betty Crocker™/Pop Secret™. The popcorn fat charge has the following composition:

| Ingredients | Weight % |
|---|---|
| Popcorn | 92.1 |
| Fat | 2.4 |
| Salt | 2.7 |
| CaCO$_2$ | 2.5 |
| Artificial butter flavor | 0.3 |
| | 100.0 |

1. A hydrogenated soybean oil available from Cargill Foods under the trade name 600S.
2. Pure calcium carbonate available from Specialty Minerals Inc. having a mean particle size of 3 µm.

A supply of the fat, butter, salt and CaCO$_2$ is prepared to form a warm slurry (about 122° F.; 50° C.). The slurry has a viscosity of 3500 cps.

The fat slurry comprises:

| Fat | 44.5% |
|---|---|
| Salt | 25.7% |
| CaCO$_2$ | 6.2% |
| Butter | 23.6% |

Thus, the slurry has about 50% of the total salt and about 50% of the calcium carbonate. The calcium carbonate had a particle size of less than 25 µm.

The salt added to the slurry was a flour salt having a mean particle size of about 22 µm.

A quantity of microwave popcorn bags were filled as follows:

About 82 g of popcorn was dispensed by the dispensing wheel into the funnel.

The popcorn filled bag was then advanced to a second filling station. A fat slurry applicator was timed to dispense about 4.7 g of the slurry in the form of a downwardly projecting vertically aligned pencil jet spray. The duration of the spray was about 0.5 seconds. The slurry charged the fat slurry within the microwave popcorn bag below the seal area.

The popcorn and fat filled bags were then advanced to a third filling station. About 1.2 g of salt were dropped by gravity into the open end of the bag. At the same time about 1 g of the CaCO$_2$ was dropped. The CaCO$_2$ was in flour form having a mean particle size of about 5.7 µm.

The bags were then heat sealed to form finished full fat microwave popcorn articles of the present invention. The articles can be further provided with a conventional moisture resistant overwrap (e.g., fabricated from polypropylene material). The microwave popcorn articles so prepared can be conventionally microwave heated to provide popped popcorn having high levels of calcium. Notwithstanding the high calcium fortification levels (20% of the Recommended Daily Intake (RDI)), the popped popcorn is neither visually nor organoleptically discernibly different from conventionally prepared microwave popcorn.

Reduced fat and full fat microwave products of the present invention can be prepared wherein in the Example the fat and butter content are adjusted in amount.

Substantially equivalent microwave popcorn articles of the present invention are prepared when the pure calcium carbonate calcium ingredient of the above example is substituted with ground limestone of similar particle size.

What is claimed is:

1. In a microwave popcorn article comprising a sealed microwave popcorn bag and a food charge disposed within the bag comprising popcorn, fat and salt, the improvement comprising: wherein at least a portion of the salt has a larger particle size than 250 microns.

2. The microwave popcorn article of claim 1 wherein at least a portion of the salt has a particle size of about 250 to 600 microns.

3. The microwave popcorn article of claim 2 wherein at least a portion of the salt is provided by a flour salt.

4. The microwave popcorn of claim 3 wherein the flour salt has a mean particle size of about 22 microns.

5. The microwave popcorn article of claim 2 comprising about 1% to 4% of the food charge of salt.

6. The microwave popcorn article of claim 5 additionally comprising a calcium ingredient in amounts sufficient to provide 360 to 3600 mg. of calcium per 100 grams of popcorn.

7. The microwave popcorn article of 6 wherein at least a portion of the calcium ingredient is pure calcium carbonate or ground limestone.

8. A method for filling a microwave popcorn bag with a food charge of popcorn kernels, a fat slurry, and a particulate, comprising the steps of:

A. providing a microwave popcorn bag having a sealed portion, an open sealable top portion defining an orifice and a seal area extending across the orifice in an open configuration and in a vertically aligned orientation;
B. filling the bag through the upper orifice with a quantity of popcorn kernels and the fat slurry;
C. filling the bag through the upper orifice with a quantity of particulate after the bag is filled with the popcorn kernels and the fat slurry; and
D. sealing the open top end of the popcorn bag after the bag has been filled with the quantity of popcorn kernels the fat slurry, and the quantity of particulate, wherein the particulate includes salt in coarse form having a particulate size of about 250 to 600 microns.

9. The method of claim 8 wherein at least a portion of the salt has a particle size of about 250 to 600 microns.

10. The method of claim 9 wherein at least a portion of the salt is provided by a flour salt.

11. The method of claim 10 comprising about 1% to 4% of the food charge of salt additionally comprising a calcium ingredient in amounts sufficient to provide 360 to 3600 mg. of calcium per 100 grams of popcorn.

* * * * *